US007408991B2

(12) United States Patent
Hourunranta (10) Patent No.: US 7,408,991 B2
(45) Date of Patent: Aug. 5, 2008

(54) ERROR DETECTION IN LOW BIT-RATE VIDEO TRANSMISSION

(75) Inventor: Ari Hourunranta, Tampere (FI)

(73) Assignee: Nokia Mobile Phones Limited, Espoo (FI)

( * ) Notice: Subject to any disclaimer, the term of this patent is extended or adjusted under 35 U.S.C. 154(b) by 752 days.

(21) Appl. No.: 10/695,722

(22) Filed: Oct. 28, 2003

(65) Prior Publication Data

US 2004/0101055 A1 May 27, 2004

Related U.S. Application Data

(63) Continuation of application No. 09/433,490, filed on Nov. 3, 1999, now abandoned.

(30) Foreign Application Priority Data

Nov. 5, 1998 (FI) ................................ 982402

(51) Int. Cl.
*H04B 1/66* (2006.01)
(52) U.S. Cl. .......................... 375/240.24; 375/240.25; 375/240.27; 375/240.26; 375/240.2; 382/233; 382/235; 382/250
(58) Field of Classification Search ............ 375/240.24, 375/240.25, 240.27, 240.26, 240.2; 382/233, 382/235, 250
See application file for complete search history.

(56) References Cited

U.S. PATENT DOCUMENTS 5,535,013 A * 7/1996 Murata ..................... 382/239
5,621,467 A * 4/1997 Chien et al. ............. 375/240.15
5,703,889 A * 12/1997 Shimoda et al. ............. 714/809
5,708,732 A * 1/1998 Merhav et al. .............. 382/232
5,745,169 A * 4/1998 Murphy et al. .............. 348/192

FOREIGN PATENT DOCUMENTS

EP          0999709 A2 * 10/2000

OTHER PUBLICATIONS

M. R. Pickering et al, 1997, IEEE, p. 773-776.*
"Still Image Coding For Noisy Channels" D.W. Redmill and N.G. Kingsbury, Signal Processing and Communications Laboratory Cambridge University Engineering Department, 1994, pp. 95-99.
Moore A., "The Theory of CCITT Recommendation H.261, Video Codec for Audiovisual Services at px64 kbit/s and review of such a codec", Dec. 16, 1993, pp. 37, Monash, Faculty of Computing and Information Technology, Department of Robotics and Digital Technology, Technical Report 93-11.

* cited by examiner

*Primary Examiner*—Shawn An
(74) *Attorney, Agent, or Firm*—Harrington & Smith, PC (57) ABSTRACT

A method for decoding video data blocks using variable length codes, comprising transforming information about the spatial frequency distribution of a video data block into pixel values. Prior to said transformation, a first reference value (Xref) representing the abruptness of variations in information about spatial frequency distribution within the block is generated, after said transformation, a second reference value (Δ) representing the abruptness of variation in certain information between the block and at least one previously transformed video data block is generated. The first reference value (Xref) is compared to a first threshold value (TH1) and the second reference value (Δ) to a second threshold value (TH2); and as a response to either of the first (Xref) and second reference values (Δ) being greater than the first (TH1) and respectively the second threshold value (TH2), an error in the block is detected.

22 Claims, 9 Drawing Sheets

ERROR DETECTION IN LOW BIT-RATE VIDEO TRANSMISSION

CROSS-REFERENCE TO RELATED APPLICATIONS

This application is a continuation of and claims priority from U.S. patent application Ser. No. 09/433,490, filed on Nov. 3, 1999 now abandoned.

FIELD OF THE INVENTION

The present invention regards video transmission, and especially a method and device for decoding compressed video data, wherein information about the spatial frequency distribution of a video data block is transformed into pixel values.

BACKGROUND OF THE INVENTION

One of the targets in telecommunications is to provide systems where good quality, real-time transmission of video, audio and data services is available. As is generally known, the amount of data needed to transfer moving pictures is high compared to many other types of media, and so far, usage of video in low bit-rate terminals has been negligible. Transmission of data in digital form, anyhow, has provided for increased signal-to-noise ratios and increased information capacity in the transmission channel. In the near future advanced digital mobile telecommunication systems will also be introducing services enhancing the transmission bit-rates, which means that transmission of video even over low bit-rate mobile channels will soon become more feasible.

For optimisation of channel capacity usage, signals are generally compressed before transmission. This is especially important with video transmission, where the amount of data to be transmitted is large. Compressed video, is easily afflicted by transmission errors, mainly because the information content of compressed video is generally coded using variable length codes. When a bit error alters the codeword to another one of different length, the decoder loses synchronisation and decodes consecutive error free blocks incorrectly until the next synchronisation code is received.

To limit the degradations in images caused by transmission errors, error detection and/or error correction methods can be applied, retransmissions can be used, and/or effects from the received corrupted data can be concealed. Normally retransmissions provide a reasonable way to protect data streams from errors, but long round-trip delays associated with low bit-rate transmission and moderate or high error rates make it practically impossible to use retransmission, especially with real-time videophone applications. Error detection and correction methods usually require a large overhead since they add some redundancy to the data. Consequently, for low bit-rate applications, error concealment can be considered as a good way to protect and recover images from transmission errors.

To be able to conceal transmission errors, they have to be detected and localised. The more is known about the type and location of the error, the better the concealment method can be focused to the problem, and accordingly the better image quality will be achieved. It is also important to find methods that can detect especially those errors that are easily detected by the human eye.

Lately, much interest has been attached to error-resilient digital video transmission, but the work has mainly been concentrated on digital TV transmission using MPEG-2. There the problem is solved mainly by adding unique sync codes frequently to the bit stream, using short packets with a cyclic redundancy check (CRC), and discarding all packets where the CRC indicates an error. When the bit-rate of transmission is a few megabytes per second, the proportion of frequently occurring sync codes or CRC fields in the whole data stream is usually acceptable. However, in low bit-rate transmission the situation is quite different, and with bit-rates of 20-30 kbps the optimisation of overheads is extremely important. Furthermore, if the size of the picture is for example 704*576 pixels, one 16*16 pixel macroblock covers about 0.061% of the whole picture, whereas in low bit-rate OCIF (Quarter Common Intermediate Format) 176*144 pixel pictures, one macroblock covers more than 1% of the whole image. Hence, the loss of a macroblock is more detrimental in low bit-rate videophone pictures than in television pictures.

The main interest in low bit-rate video coding standardisation bodies has been to improve error resilience of inter coded frames. Most presented methods suggest changing of the bit-stream syntax and coding algorithms, whereby they can be properly utilised only if they are widely supported by users' videophone terminals. Generally two methods of error detection have been put forward: detection of illegal variable length coding (VLC) code words, and detection of missing end block codes of discrete cosine transform (DCT) matrices. In practice these methods have been found to be insufficient especially for intra coded blocks, since a great many VLC errors remain undetected, and errors in fixed length coded DC components of intra coded blocks are often not detected at all. Furthermore, errors are usually detected far too late, after decoding several corrupted blocks.

The publication of Wai-Man Lam and Amy R. Reibman, "An error Concealment Algorithm for Images Subject to Channel Errors", in IEEE Transactions on Image processing, Vol. 4, No. 5, pp. 533-542, May 1995 presents some DCT and pixel domain error detection algorithms. These algorithms, however, do not apply adequately to low bit-rates and low resolutions, especially due to the inapplicability of DCT domain algorithms for the different characteristics of quantised DCT matrices.

The publication of Aki Hietala, "Virhesietoinen videodekoodaus", Master of Science Thesis, Oulu University, Department of Electrical Techniques, 1997, presents and analyses some methods for error detection in video bitstreams. The methods utilise the residual correlation of adjacent pixels (spatial correlation) and by detecting anomalies in block boundaries, search for corrupted blocks. However, the methods are considered rather complex and the achieved effect has not yet been sufficient.

The publication of M. R. Pickering, M. R. Frater, J. F. Arnold, and M. W. Grigg, "An Error Concealment Technique in the Spatial Frequency Domain", Signal Processing, no.54, Elsevier 1996, pp. 185-189 presents a method for concealing errors that are caused by blocks in the image which are similar in appearance to a single DCT basis function. In the method unusually large DCT coefficients in the 8*8 block of coefficients are detected and reduced to zero. This method works well with specific types of transmission errors, but as a single means of detection has a limited effect.

SUMMARY AND OBJECT OF THE INVENTION

Now, a new method for decoding video data blocks using variable length codes has been invented with which the above mentioned drawbacks can be reduced. The method according to the invention is characterised by generating, prior to said transformation, a first reference value representing the variations in information about spatial frequency distribution within the block; generating, after said transformation, a second reference value representing the abruptness of variation in certain information between the block and at least one previously transformed video data block; comparing the first reference value to a certain first threshold value and the second reference value to a certain second threshold value; and detecting an error in the block, as a response to either of the first and second reference values being greater than the first and respectively the second threshold value.

An object of the invention is to provide a set of improved error detection elements to be combined with different steps of decoding intra coded video data blocks. The use of at least two of the error detection elements of the invention utilising information in different forms and/or stages of the decoding process will improve the accuracy of error detection and still not unreasonably increase the complexity of the decoding process. The use of error detection according to the invention enables enhanced error concealment processes and therewith improves the error resilience of video data transmission at low bit-rates.

The invented methods utilise the slowly varying nature of information in natural pictures by assuming a relatively high correlation between adjacent blocks. Blocks with shapes that are very improbable in nature can be studied more carefully. In the methods, relatively high correlation is expected between neighbouring blocks and means for noticing some very abrupt variations in bit-streams are presented. An unexpected anomaly in the video sequence is interpreted as indicating a suspicious or corrupted block, or a number of blocks (macroblock).

Furthermore, a device for decoding video data is presented. The device comprises means for transforming information about the spatial frequency distribution of a video data block into pixel values; and it is characterized by means for generating, prior to said transformation, a first reference value representing the variations in information about spatial frequency distribution within the block; means for generating, after said transformation, a second reference value representing the abruptness of variation in certain information between the block and at least one previously transformed video data block; means for comparing the first reference value to a certain first threshold value and the second reference value to a certain second threshold value; and means for detecting an error in the block, as a response to either of the first and second reference values being greater than the first and respectively the second threshold value.

BRIEF DESCRIPTION OF THE DRAWINGS

The invention will now be described, by way of example only, with reference to the accompanying figures, of which.

The flow chart of FIG. 5a illustrates the principle of the first detection element according to the invention.

The flow chart of FIG. 5b illustrates an embodiment of the method of FIG. 5a.

DETAILED DESCRIPTION OF THE INVENTION

Figure 1:
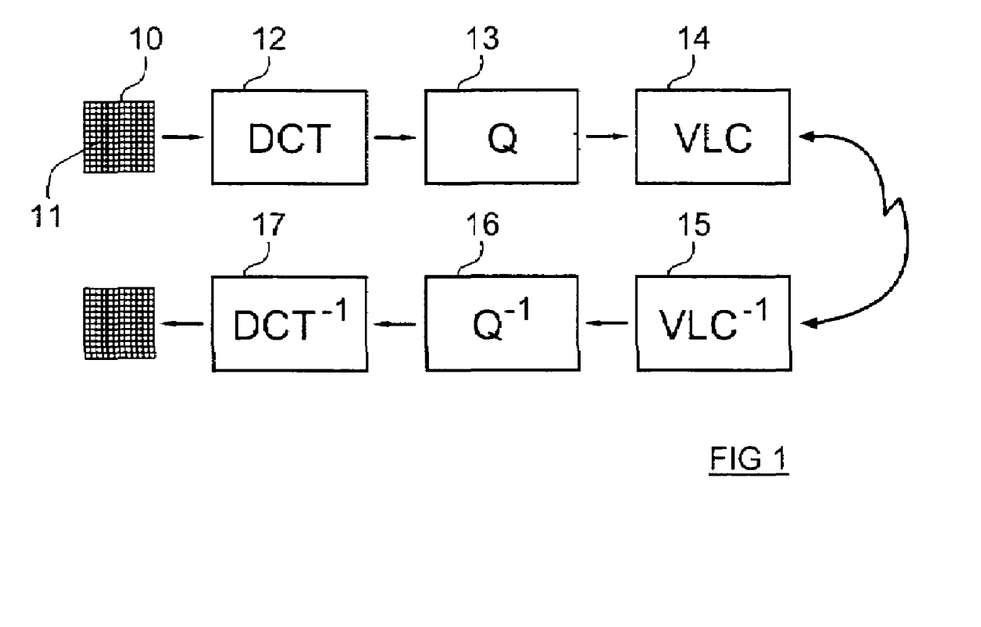
FIG. 1 illustrates the phases of encoding and decoding intra-coded video images.

A digital image is formed by sampling and quantising analogue picture information and transforming the generated data into a continuous stream of bits. The digitised signal allows the use of advanced digital signal processing tools, which permit faster and more efficient data transfer. Several image-coding algorithms have recently been developed to reduce the number of bits necessary for digital image representation and correspondingly reduce the bit-rates required for transmission of digital images. JPEG (Joint Photographic Experts Group) is a widely used algorithm for still images, CCITT (ITU Telecommunication Standardisation Sector) recommendation H.261 has been developed for videoconferencing, H.263 for videotelephony and MPEG (Moving Pictures Expert Group) for transferring and storing moving video pictures. The block diagram of FIG. 1 illustrates the basic stages of video encoding and decoding used in these standards and generally known to a person skilled in the art. The digital image data is divided 11 into small blocks comprising a certain number of pixels (e.g. one block contains 8×8 pixels). The data in each block is transformed into the spatial-frequency domain using the Discrete Cosine Transform (DCT) 12. The derived DCT matrix is quantized 13 and the quantized signal is coded using a table of Variable Length Codewords (VLC) 14. The coded signal is transmitted to the receiver. At the receiving end the inverse processes 15, 16 and 17 are implemented in a reverse order to reconstruct the image.

Figure 2:
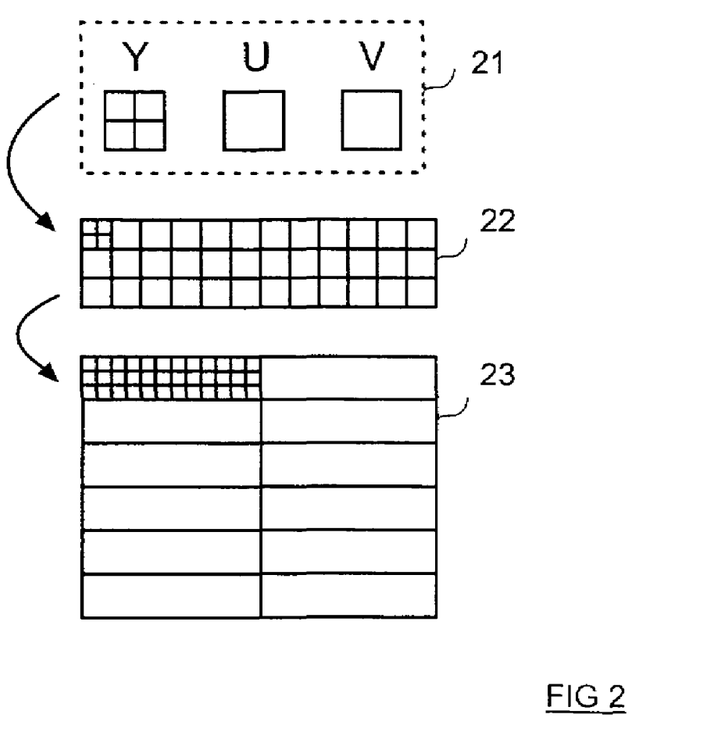
FIG. 2 illustrates the configuration of a video image according to the H.261 standard.

The resolution of a digital image is defined by the number of pixels in the picture matrix. Sampling with 8 bits for each of one luminance (Y) and two chrominance components (U, V) results in $2^{24}$~16 million available colours. The human visual system is more sensitive to luminance than chrominance components, so generally the chrominance components of the picture are spatially undersampled. For example in ITU-T H.261 recommendation, for every four luminance blocks two chrominance blocks are used. As illustrated in FIG. 2, sets of 4 luminance and 2 chrominance blocks form a macroblock 21, and an H.261 image 23 comprises 12 block groups 22, that are formed by 3×11 macroblocks. Corresponding structural grouping systems are used in other coding standards.

Figure 3:
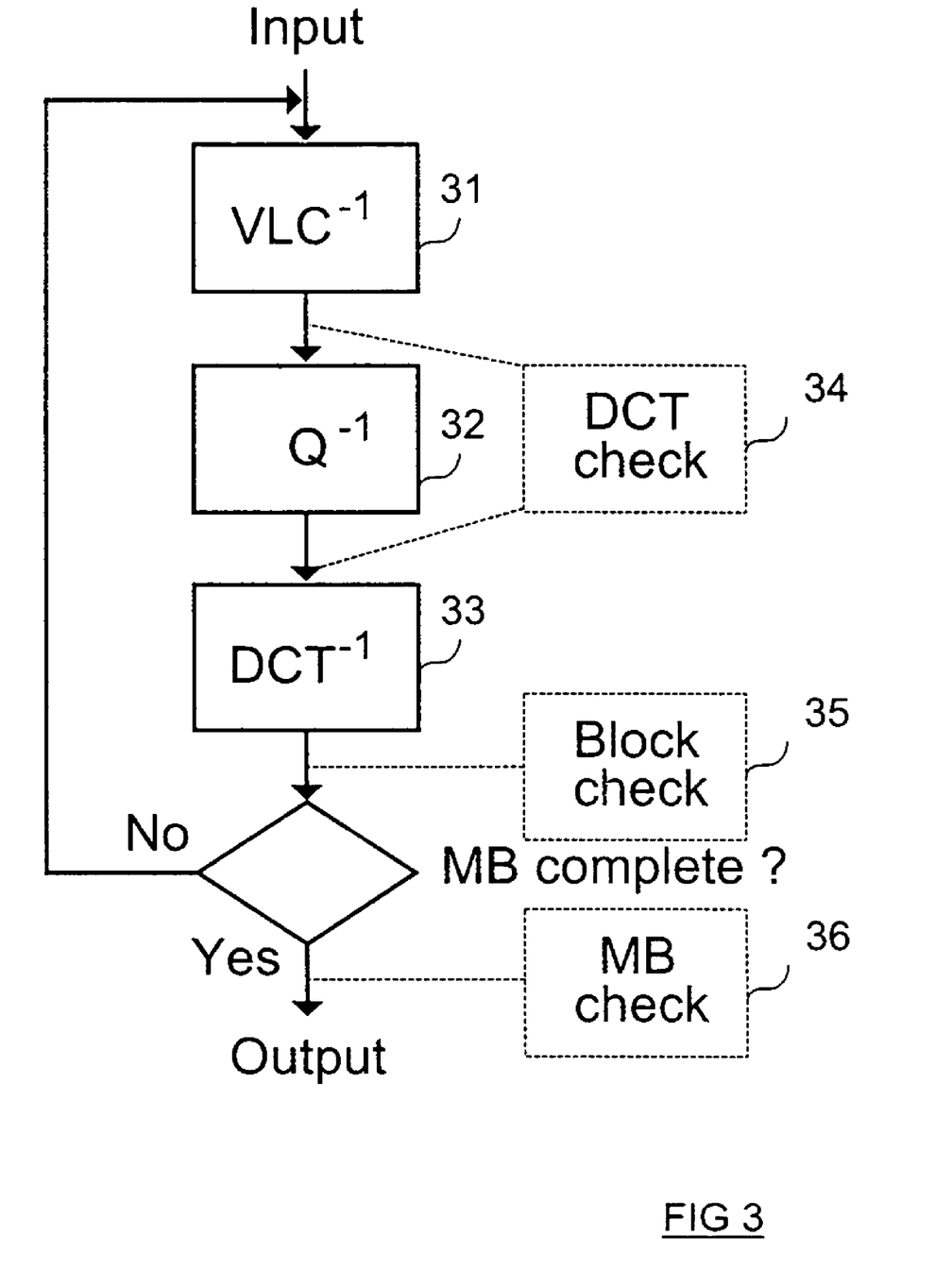
FIG. 3 illustrates the elements of the invented method.

The flow chart of FIG. 3 illustrates the elements of the invented method in connection with the steps of decoding a macroblock. The invention is based on the idea that blocks are an artificial way to divide information, and therefore in low bit-rate video sequences variations of natural images between blocks should occur slowly and/or within certain limits in an expected manner. The method comprises three separate detection elements, of which at least two are combined with the decoding process of variable length decoding 31, inverse quantization 32 and inverse DCT 33. The detection elements utilise available information at the different levels of decoding to detect transmission errors. The first detection element 34 performs steps for inspecting block level DCT components, and it can be performed either before or after inverse quantization. For the purposes of the second and third detection elements, the DCT components of the current macroblock are temporarily stored e.g. to a volatile memory of the decoder. The second detection element 35 performs steps for block level spatial comparison, and the third detection element 36 performs comparisons at the macroblock level. For detection, only corresponding components are compared with each other (i.e. Y-, U-, and V-components separately). The interpretation of detection can rely on results from studying only one component, or results from studying more components as well. In the following, the detection elements of FIG. 3 will be studied in more detail.

1. First Detection Block (34)

Figure 4:
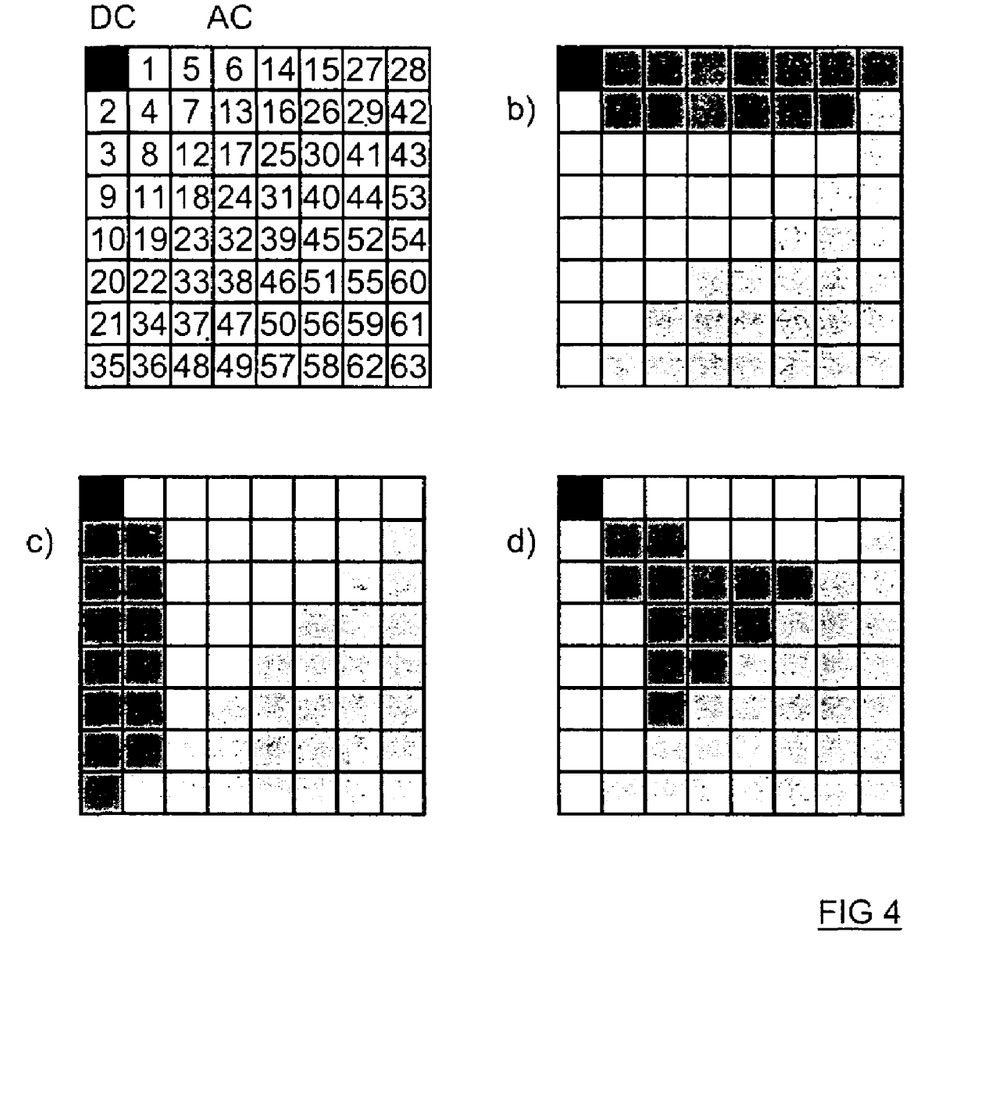
FIG. 4a illustrates the configuration of a DCT matrix.
FIGS. 4b-4d illustrate different ways of dividing a DCT matrix.

After a discrete cosine transform, a pixel block can be presented as a DCT matrix comprising a DC coefficient and a plurality of AC coefficients, zigzag-scanned from lower to higher frequency coefficients as shown in FIG. 4a. In practice, it is highly improbable that there would be large amplitudes in high frequency AC components in low-resolution pictures. However, large amplitudes are possible, and in the invented method they are not simply filtered out, but are used to detect errors by appreciating the fact that high frequency AC components should have smaller absolute values than the lower frequency AC coefficients.

Figure 5A:
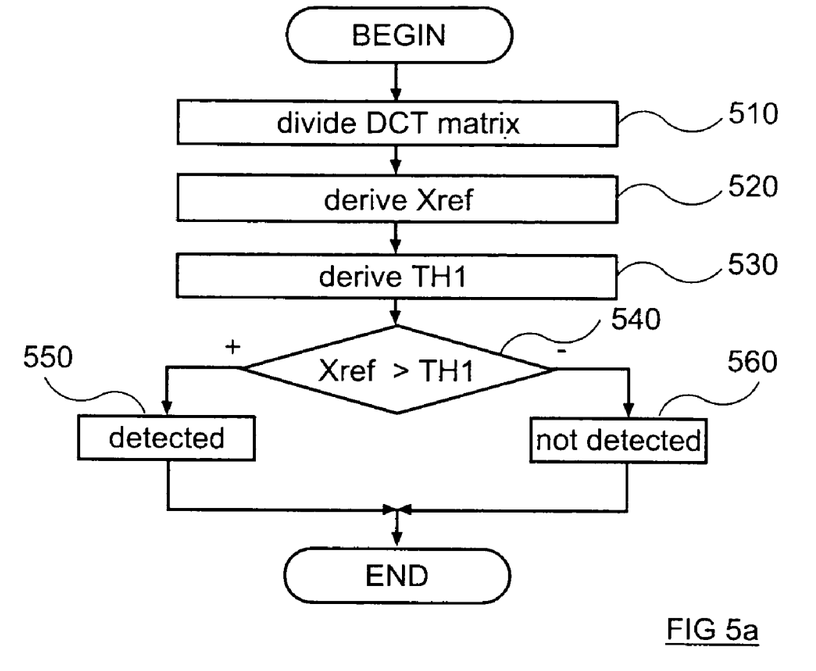

The flow chart of FIG. 5a illustrates the principle of the first detection element by a simplified method to check the validity of a DCT matrix. In step 510 the AC components of the DCT matrix are divided into at least two groups, where certain higher frequency components AC36-AC63 (ref: FIG. 4a) form a first group and a second group is a selected set of the remaining AC components (later referred to as low frequency components). At least one first threshold value TH1, representing the activity in the lower frequencies is calculated from the AC components of the second group (step 520). Furthermore, at least one reference value Xref is calculated in step 530. The reference value represents the magnitude of non-zero coefficients, for example of the AC components of the first group or of the AC components of the second group. The reference value Xref is compared (step 540) to the derived first threshold value TH1, and if the reference value is greater than the threshold value (step 560), it means that an error is detected.

Figure 5B:
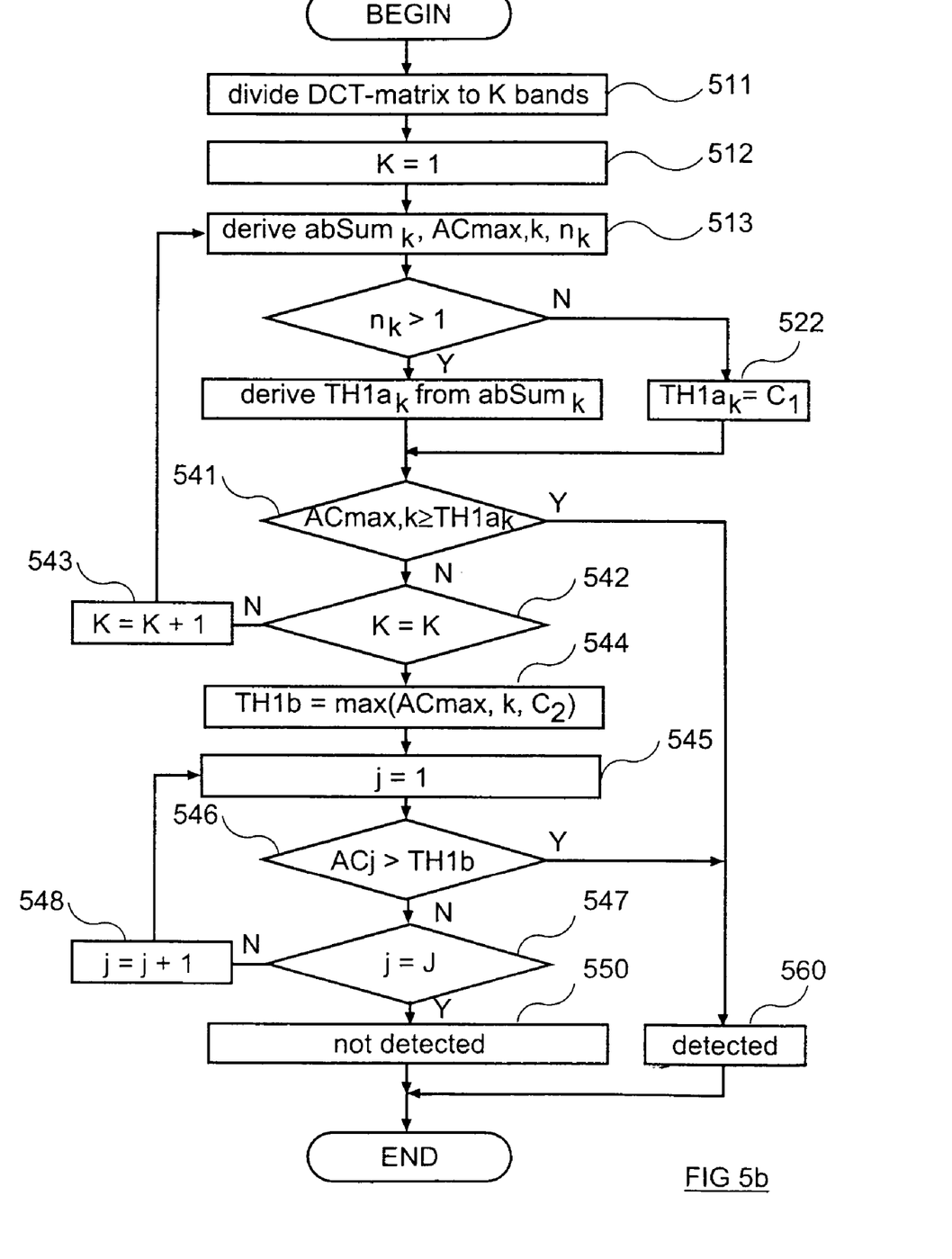

The flow chart of FIG. 5b illustrates an embodiment of the method in FIG. 5a, in which actually two first reference values and corresponding first threshold values are generated. In step 511 the DCT matrix is divided into horizontal, vertical, diagonal and high frequency bands. Exemplary horizontal, vertical and diagonal bands, further referred to collectively as low frequency bands, are illustrated in FIGS. 4b, 4c, and 4d respectively. There can be some overlap between these low frequency bands. In step 512 the first low frequency band k is chosen. The absolute sum $abSum_k$ of the coefficients, the greatest absolute coefficient value $AC_{max,k}$ and the number $n_k$ of non-zero factors of $abSum_k$ are calculated in step 513. In step 514 the number of non-zero coefficients in the low frequency band k is checked, and if there are more than one non-zero coefficients in the band, the coefficient with the greatest absolute value $AC_{max,k}$ is subtracted from the absolute sum of the other non-zero coefficients $abSum_k$, and the sum is added to a predefined constant value $C_1$. The attained sum is defined 521 as an auxiliary first threshold TH1a. If there is only one or no non-zero coefficients, the auxiliary first threshold value TH1a is defined 522 to be the predefined constant value $C_1$. In step 541 the greatest absolute coefficient value $AC_{max,k}$ (first reference value) is compared to the first threshold value TH1a, and if the first reference value $AC_{max,k}$ is greater or equal than the first threshold value TH1a, an error is detected 560. If the first reference value $AC_{max,k}$ is smaller than the first threshold value TH1a, it is checked 542, whether all low frequency bands have already been examined. If not, the next one is chosen (step 543).

When all the low frequency bands have been examined, the high frequency band is also studied. In step 544 a second first threshold is derived from the absolute values of coefficients in the low frequency bands by choosing $TH1b = max(C_1, AC_{max,k}; k=1 \ldots K)$. After this, the first coefficient j of the high frequency band is examined (step 545). The first reference value now Xref is the absolute value of the chosen high frequency coefficient, and if the Xref is greater than the threshold TH1b (step 546), an error is detected (step 560). The loop (steps 546-548) is repeated until all the components in the high frequency band have been studied. If neither of the thresholds TH1a and TH1b are exceeded in the process, the method indicates (step 550) that no errors have been detected in this block at this stage.

2. Second Detection Element (35)

Figure 6:
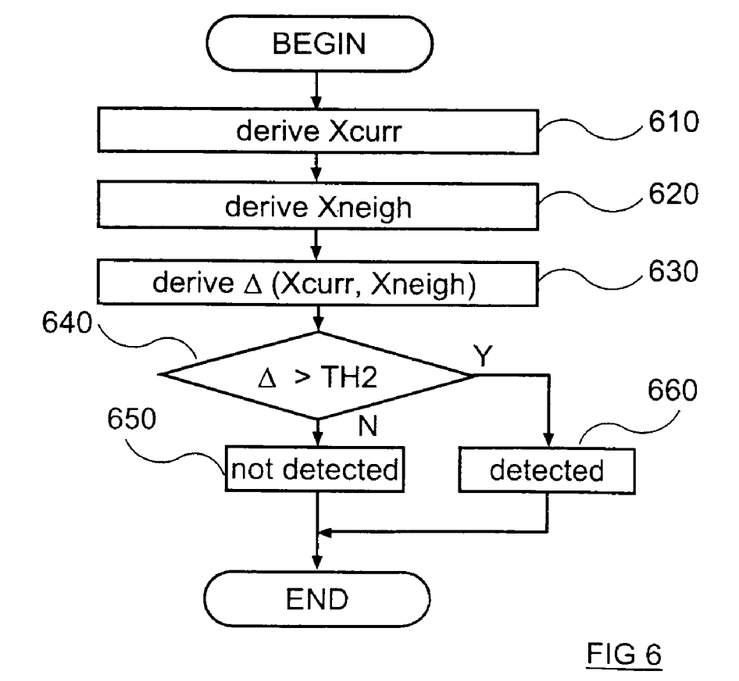
FIG. 6 illustrates the principle of the second detection block according to the invention.

As already mentioned, variations between neighbouring blocks in natural pictures tend to progress relatively smoothly. Consequently, the operation of the second detection element is based on monitoring correlation between neighbouring blocks. Preferentially, the second detection element is included in the decoding process after the inverse discrete cosine transform. For the purposes of the second and third detection elements, the DCT components of the current macroblock are temporarily stored e.g. to a volatile memory of the decoder. The flow chart of FIG. 6 illustrates the principle of the second detection element according to the invention.

In step 610 a reference value Xcurr is derived from the information of the current block. The reference value Xcurr represents a feature that presumably continues over the block boundaries, and can be derived in several ways, as will be shown later. In step 620 a corresponding reference value Xneigh is derived from the information of at least one neighbouring block. In step 630 the reference values are compared with each other in order to derive a difference value representing the variation Δ of the studied feature when moving from block to block. If the variation is larger than a second threshold TH2 (step 640), an error is detected (step 660). If the variation does not exceed the second threshold TH2, no error is detected (step 650). The second threshold TH2 can be e.g. a predefined constant.

In an embodiment of the invented method, the reference value Xcurr is the DC component of the block. Only previously decoded blocks are available for comparison. If the error checking method is used during decoding, the DC components in blocks to the left, above, above-left and above-right are available for comparison. If the check is done only after the whole frame is decoded, possible neighbours for some blocks can also be found in the row below the current one. If the difference between the current block and every available neighbouring block is larger than a certain threshold, an error in the current block is detected. In practice, the threshold should be rather high, since in low resolution images the contents of two adjacent blocks can be quite different. Anyhow, this check requires only a few comparisons and storing of DC components, and therefore does not add much complexity to the decoding process.

In another embodiment of the invented method, the studied block is divided into a number of sub-blocks (for example an 8*8 block is divided into four 4*4 sub-blocks). For each sub-block the average of the pixel values is calculated and the calculated value is used as the reference value Xcurr for that sub-block. As a reference value of the neighbouring block Xneigh, the averaged pixel value of the neighbouring sub-block in left, above, above-left and above-right directions in turns are used. The variation Δ equals the difference between the reference value Xcurr and the averaged pixel value Xneigh of each of the studied neighbouring sub-blocks. If the difference Δ for a sub-block and any of its studied neighbours is greater than a predefined second threshold TH2, an error is detected. Anyhow, if such interpretation in this case seems too strong, the block can be marked suspicious, and the check can be supplemented with some other check.

Figure 7:
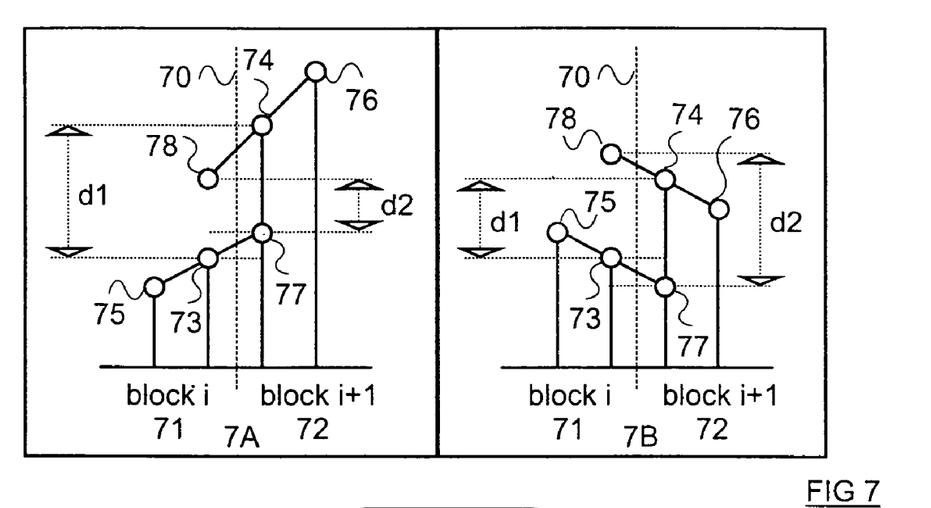
FIG. 7 illustrates the principle of an embodiment of the second detection block.

In another embodiment of the invented method, pixels in the block boundary are used to check the continuity of the image. In prior art solutions, only pixels immediately in the block boundary are studied, but in practice, this has not proved to be enough. In an enhanced method, the gradient of changes in pixel values close to the boundary is also taken into account. The principle of such an embodiment of the second detection block is illustrated in FIG. 7.

In FIG. 7a a boundary 70 between two adjacent blocks 71 and 72 is shown. Point 73 represents the value of a chosen component (e.g. luminance) of the pixel of the first block 71 closest to the boundary 70. Point 74 represents the value of the same component for a pixel of the second block 72 closest to the boundary and in the same row as the pixel of point 73. Point 75 represents the value the same component for a pixel of the first block 71 situated next to the boundary pixel 73 and farther away from the boundary 70. Point 76 represents the value of the same component for a pixel of the second block 72 situated next to the boundary pixel 74 and farther away from the boundary 70. First, the difference d1 between values of boundary pixels 73 and 74 is derived. Then, values 77 and 78 are extrapolated from the values of points 73/75 and 74/76 respectively. The difference d2 between the extrapolated values is calculated, and the differences d1 and d2 are compared with each other. The smaller of them min(d1, d2) is added to a cumulative sum Δ calculated for the boundary 70 of the block 71. The total sum Δ is compared with a predefined second threshold TH2, and if the sum Δ is greater than TH2, the other boundaries are checked similarly. If the sums of all boundaries exceed TH2, an error is detected. In this example the luminance component is used for calculations, but generally any of the luminance and chrominance components (Y, U, V) can be used, and/or the check can be implemented for each of the components separately. The criterion can also be modified to indicate an error if the sum of one/two/three boundaries show values exceeding TH2. In FIG. 7b the same arrangement as in FIG. 7a, but with different pixel values and a different direction of change is presented. With extrapolation, unnecessarily hasty conclusions about the validity/non-validity of the block can be avoided.

In the prior art literature some edge detectors for block boundaries have been presented. The embodiments shown here can be supplemented with the use of such edge detectors, e.g. compass gradient operators.

3. Third Detection Element (36)

Figure 8A:
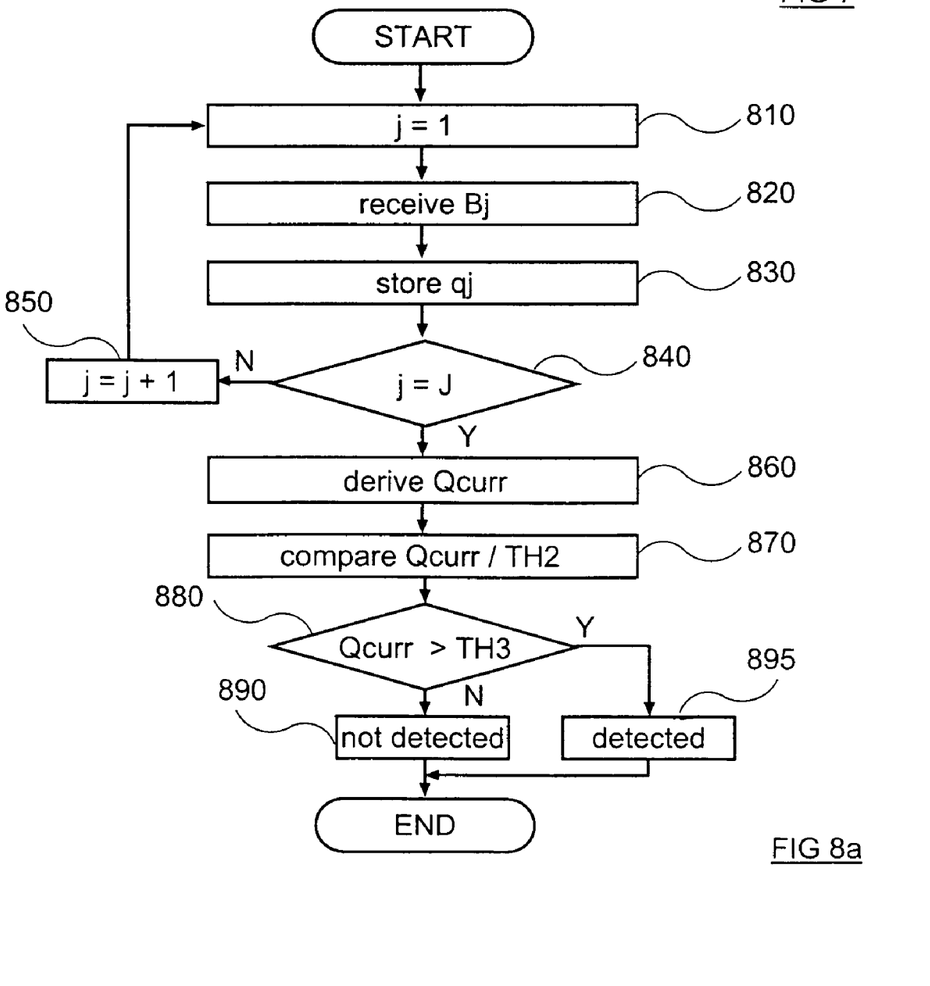
FIG. 8a illustrates the principle of the third detection block according to the invention.

At the macroblock level information about a plurality of blocks can be studied and deviations between blocks can be examined in more detail. For the purposes of macroblock check, all or a chosen set of DCT components of the macroblock will be stored in a volatile memory of the decoder. The flow chart of FIG. 8a illustrates the principle of detection methods at the macroblock level. In steps 810 and 820 the first block $B_j$ is received and a certain macroblock level parameter $q_j$ representing the feature whose variations are examined throughout the macroblock is stored in a memory 830. Information is gathered with the progress of loop of 810-850 until the counter j reaches the value J (step 830), which equals the number of blocks in the macroblock. When the whole macroblock has been received and the parameters $q_j$ for all blocks are stored, a reference value or a set of reference values Qcurr is derived 860 from the parameters $q_j$. Qcurr is checked 870 against a third threshold TH3 representing a limit set for Qcurr to fulfil certain predefined criteria. In case the reference value Qcurr is less than the third threshold TH3, no error is detected (step 890). If the reference value exceeds TH3, an error is detected (step 895).

Figure 8B:
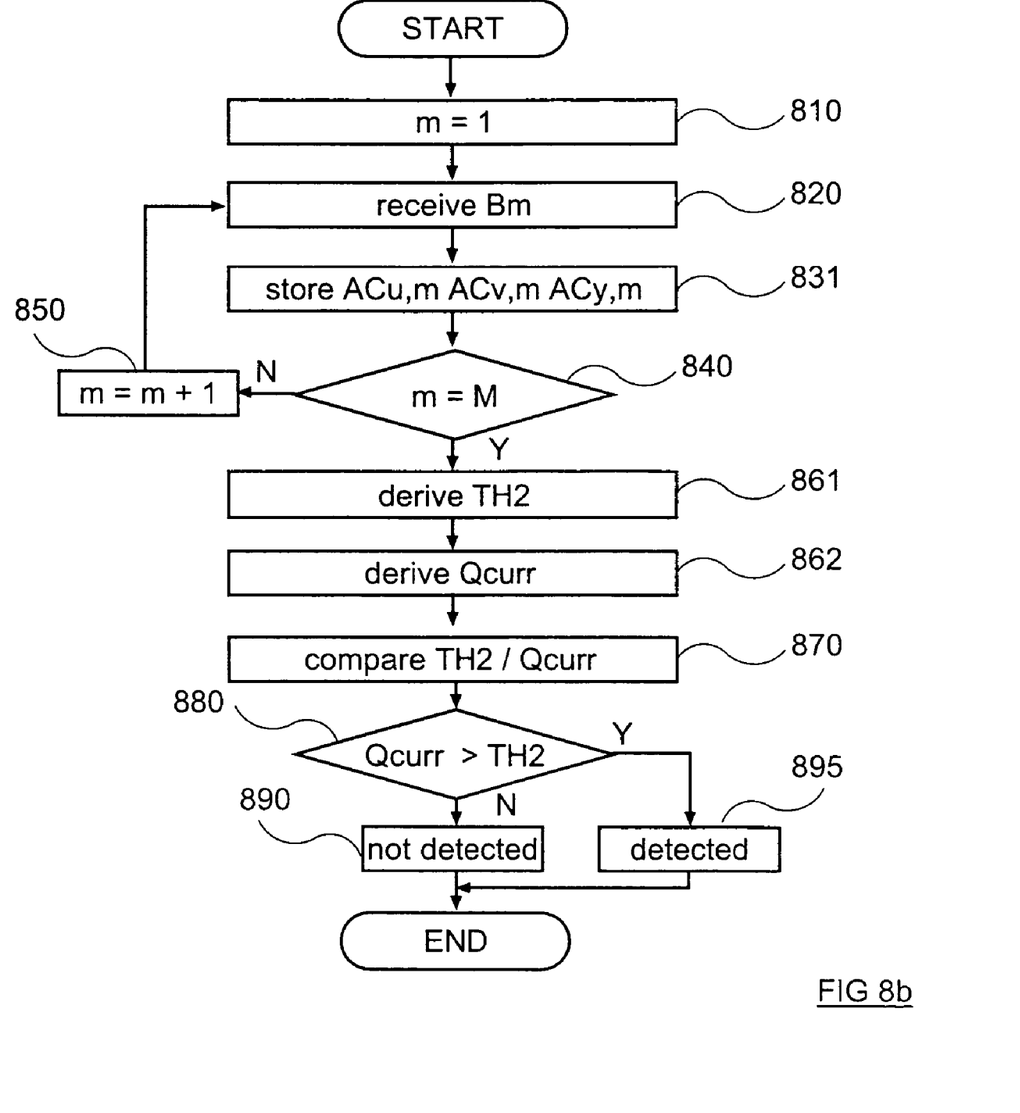
FIG. 8b illustrates an embodiment of a third detection block according to the invention.

In an embodiment of the method as shown in FIG. 8a, the reference values and the checking criteria are based on local spectral correlation. In practice, most of the visually noticeable shape information of a frame can be found in the luminance component. Consequently, if there are small changes in luminance blocks, not many changes should occur in chrominance blocks of the macroblock either. This is especially true if the image is sampled e.g. using 4:2:0 format (i.e. four Y-blocks with one U-block and one V-block). The flow chart of FIG. 8b illustrates such an embodiment of a method according to the invention.

Steps 810-850 follow the process illustrated with FIG. 8a, except that in step 831 the parameter $q_m$ represents the variations of the values of the AC coefficients in U, V, and Y blocks ($AC_{U,m}, AC_{V,m}, AC_{Y,m}$) of the macroblock. In step 861 values $AC_{U,M}$ and $AC_{V,M}$ representing the amount of variation of AC components in U- and V-blocks is derived, and they are processed into a value TH3 representing the third threshold. In step 862 a corresponding reference value $AC_{Y,J}$ representing the variation of AC components in the luminance (Y) blocks is derived and processed into a third reference value Qcurr. In block 871 the reference value Qcurr and the threshold value TH3 are compared with each other and if the threshold based on variations in chrominance components (U and V) is much bigger than the reference number based on variations in luminance (Y) components (step 880), the macroblock is considered corrupted (step 895). Otherwise no errors are detected (step 890) at the macroblock level. Another possibility is e.g. to study the variation in the DC-components of U- and V-blocks against the variations of the Y-components in comparison to some earlier decoded macroblock. If e.g. variation in U- and V-block DC-components exceed one auxiliary third threshold and variations in Y-block DC-components do not exceed another auxiliary third threshold, an error is detected.

Figure 8C:
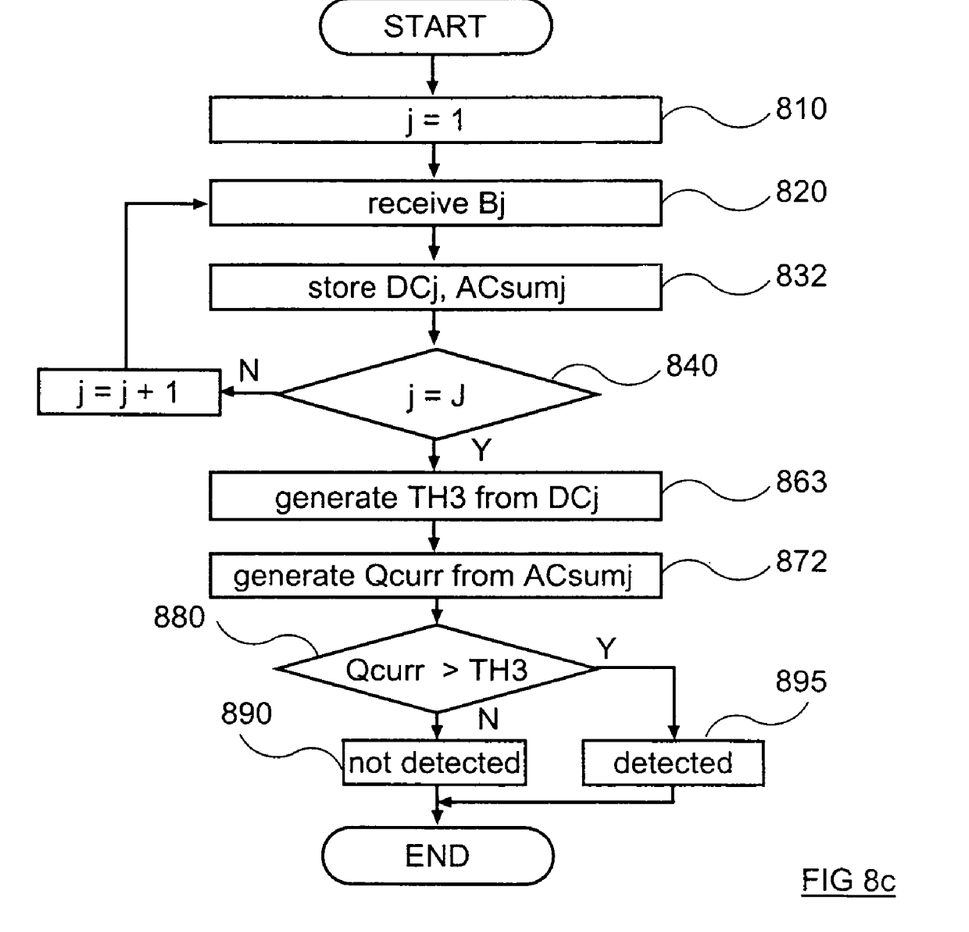
FIG. 8c illustrates another embodiment of the method according to the invention.

The flow chart of FIG. 8c illustrates another embodiment of the method according to the invention. The parameters to store in step 832 of the receiving loop are the DC components of the macroblock and an absolute sum of AC components of the macroblock. In step 863 the magnitude of variations in the DC-components throughout the macroblock is calculated and the absolute sum of AC components needed to account for the variations of the DC component is estimated. The estimated sum is used as a third threshold value TH3, and the actual variation In DC components is used as a third reference value. If the DC-components are varying noticeably and the AC coefficients are not enough to smooth the changes, the compatibility of the coefficients is questionable (step 872). By comparing the reference value Qcurr to the threshold value TH3 (step 880), the macroblock can be interpreted to be corrupted (step 895) or not (step 890).

The method herein has been presented at the macroblock level, but macroblocks can also be checked in rows. In the very first row of a video frame, there are not many neighbouring blocks or macroblocks available for comparison. If there are no abrupt changes in the first row and the values fall within a typical range, they can be considered uncorrupted. If there is any doubt, the values of the first row should be checked together with the second row. If the values of the first row are very different from the values in the second row, and the values of the second row do not contain any abrupt changes, the first row is probably corrupted.

Figure 9:
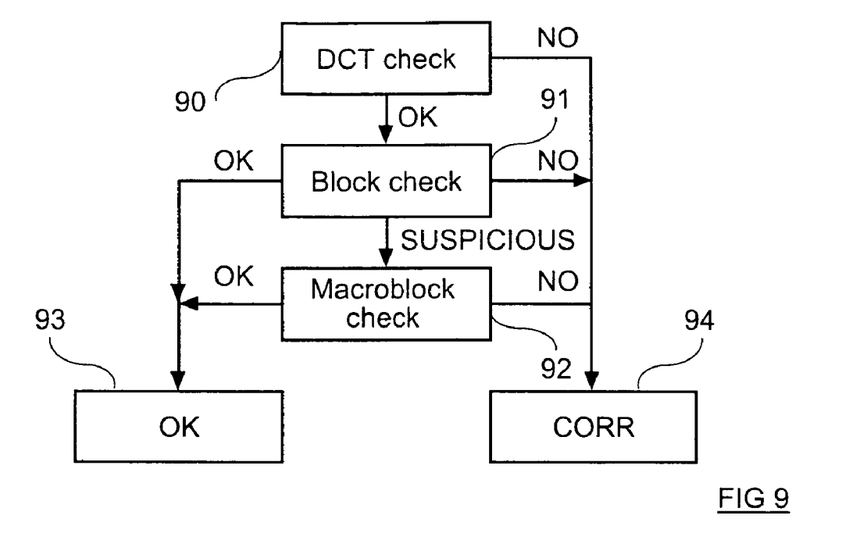
FIG. 9 illustrates a functional architecture of an embodiment of the invention.

The flow chart of FIG. 9 illustrates the functional architecture of an embodiment of the invention, where all three presented elements are included in the decoding process. First the method(s) 90 for checking the DCT components within blocks are implemented and the corrupted blocks are filtered out therewith. Even for the blocks that pass the DCT check a block check 91 is performed. Corrupted blocks are again filtered out, and suspicious blocks (i.e. blocks that have failed detection methods that do not detect errors but mark suspicious blocks) are forwarded for macroblock checking 92. Blocks that pass DCT check and block check and/or macroblock check are forwarded normally 93, and the blocks that fail any of the checks are forwarded with an error indication for initiation of error concealment methods.

Figure 10:
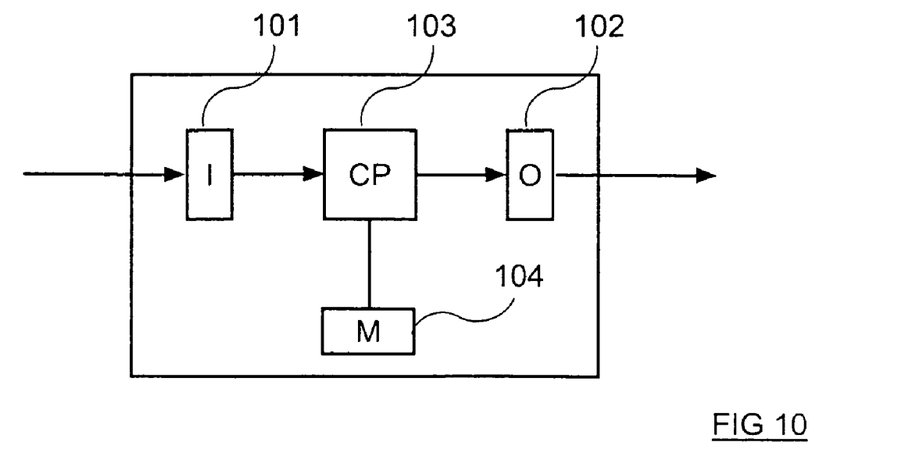
FIG. 10 illustrates an embodiment of a video image decoder according to the invention.

The block diagram of FIG. 10 illustrates an embodiment of a video image decoder 100 according to the invention. The decoder comprises an input port 101 for receiving video image information in the form of variable length codes, and an output port 102 for outputting processed video image information. The decoder further comprises at least one processor 103 for implementing the steps of decoding presented in FIG. 1. A processor of a decoder according to the invention is further arranged to include at least two of the three presented detection blocks in the decoding process, and whenever justified, to add an indication of a detected error to the output video image information. The processor is also arranged to initiate a predefined error concealment process as a response to a detected error in a decoded block or a macroblock. The memory 104 comprises at least a volatile memory for saving data during the decoding process.

Figure 11:
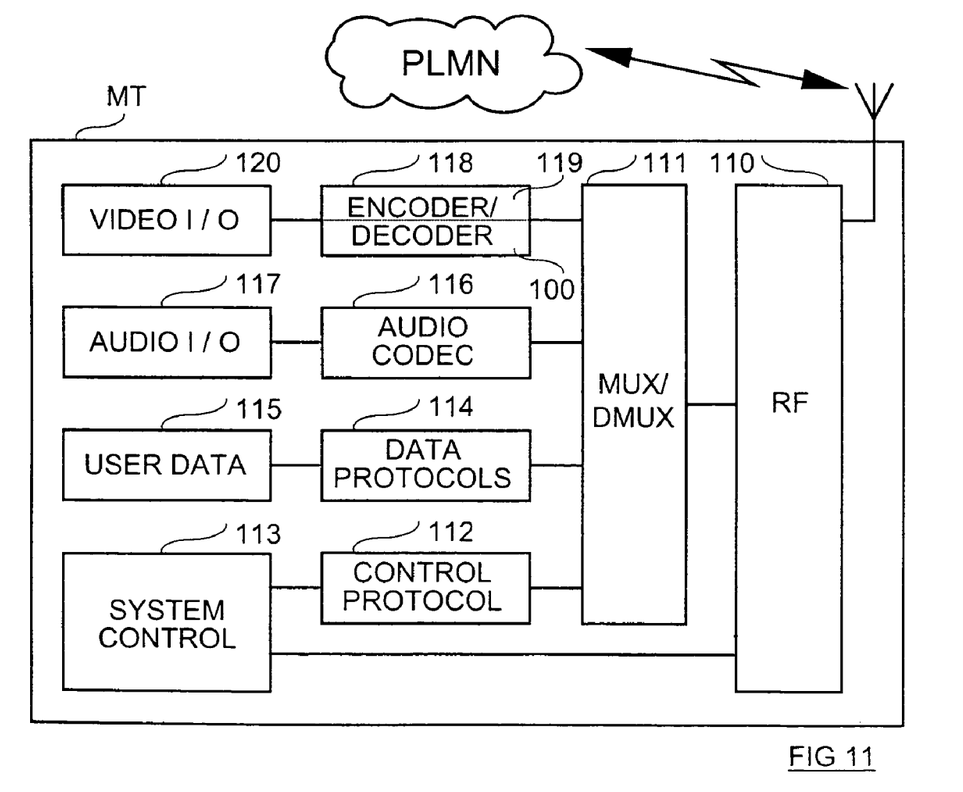
FIG. 11 illustrates an embodiment of a mobile terminal according to the invention.

The functional block diagram of FIG. 11 illustrates a generic mobile multimedia videophone terminal according to the invention. The terminal comprises a radio frequency unit 110 generally comprising means for transmission (e.g. channel coding, interleaving, ciphering, modulation and radio transmission) and for receiving (radio receiving, demodulation, deciphering, and channel decoding), a duplex filter and an antenna. The received synchronous bit stream is sent to the multiplex/demultiplex protocol unit 111 of the terminal. The Multiplex protocol multiplexes transmitted video, audio, data and control streams into a single bit stream, and demultiplexes a received bit stream into various multimedia streams. In addition, it performs logical framing, sequence numbering, error detection, and error correction, as appropriate to each media type. The control protocol 112 of the system control 113 provides end-to-end signaling for operation of the multimedia terminal, and signals all other end-to-end system functions. It provides for capability exchange, signaling of commands and indications, and messages to open and fully describe the content of logical channels. The data protocols 114 support data applications 115 such as electronic whiteboards, still image transfer, file exchange, database access, audiographics conferencing, remote device control, network protocols etc. The audio codec 116 encodes the audio signal from the audio I/O equipment 117 for transmission, and decodes the encoded audio stream. The decoded audio signal is played using audio I/O equipment 117. The video codec 118 comprises a video encoder 119 and a video decoder 100, and carries out redundancy reduction coding and decoding for video streams to and from the video I/O equipment 120. The terminal accoring to the invention comprises a video decoder 100 as described earlier in connection with FIG. 10.

The above is a description of the realization of the invention and its embodiments utilizing examples. It is self-evident to a person skilled in the art that the invention is not limited to the details of the above presented embodiments and that the invention can also be realized in other embodiments without deviating from the characteristics of the invention. Especially the criteria for the decision of detected error and the choise of threshold can be adjusted in many ways according to the application. The presented embodiments should therefore be regarded as illustrating but not limiting. Thus the possibilities to realize and use the invention are limited only by the enclosed claims.

The invention claimed is:

1. A method comprising:
   transforming information about the spatial frequency distribution of a video data block into pixel values;
   generating, prior to said transformation, a first reference value representing the variations in information about spatial frequency distribution within the block;
   generating, after said transformation, a second reference value representing the abruptness of variation in certain information between the block and at least one previously transformed video data block from a same frame as the block;
   comparing the first reference value to a certain first threshold value and the second reference value to a certain predetermined second threshold value;
   detecting an error in the block, as a response to either of the first and second reference values being greater than the first and respectively the second threshold value;
   dividing DCT coefficients of the block into at least two parts, wherein the coefficients of the first part are associated with higher frequencies than the coefficients of the second part;
   generating a first reference value from the coefficients of the first part;
   generating a first threshold value from the coefficients of a set of coefficients not belonging to the first part;
   forming at least two sets of DCT coefficients from the coefficients not belonging to the first part;
   generating a first reference value for each formed set of DCT coefficients;
   generating a corresponding first threshold value for each formed set of DCT coefficients;
   comparing, for each of the sets, the first reference value of the set with the first threshold value of the set; and
   detecting an error in the block, as a response to any of the first reference values of the set being greater than the corresponding first threshold value of the set.

2. A method according to claim 1 comprising:
   generating, after decoding a number of blocks forming a macroblock, a third reference value representing the abruptness of variations in certain information within the macroblock;
   comparing the third reference value to a certain third threshold value;
   detecting an error in the macroblock, as a response to the third reference value being greater than the third threshold value.

3. A method according to claim 2 comprising:

dividing the AC coefficients of the macroblock into groups of values of at least U-blocks, V-blocks and Y-blocks;

generating sets of values representing the variation in the AC values of U-, V-, and Y-blocks in the macroblock;

generating a third reference value from the magnitude of variations in U- and V-components; and generating a third threshold value from the magnitude of variations in the corresponding Y-component.

4. A method according to claim 2 comprising:

generating the third reference value from the absolute sum of values of AC coefficients in a number of blocks in a macroblock; and generating the third threshold value from the estimated sum of values of AC coefficients needed to account for the variation in DC coefficients in said number of blocks.

5. A method according to claim 2 comprising:

marking the blocks as suspicious, as a response to either of the first and second reference values being greater than the first and respectively the second threshold value; and initiating further detection for macroblocks comprising at least one block marked as suspicious.

6. A method according to claim 1 comprising:

generating, after decoding a number of blocks forming a macroblock, a third reference value representing the abruptness of variations in certain information between the macroblock and at least one previously decoded macroblock;

comparing the third reference value to a certain third threshold value; and detecting an error in the macroblock, as a response to the third reference value being greater than the third threshold value.

7. A method according to claim 3 comprising:

generating the third reference value from the differences between the DC values of U-, and V-blocks in the macroblock and in at least one previously decoded macroblock; and generating a third threshold value from the differences between the DC values of Y-blocks in the macroblock and in at least one previously decoded macroblock.

8. A method according to claim 1 comprising:

initiating, as a response to the detected error, an error concealment process.

9. A method according to claim 1, wherein said first reference values are the greatest absolute coefficient values of a set of DCT coefficients, and the first threshold values comprise a predefined constant value added, as a response to the number of non-zero coefficient values being greater than one, to the absolute sum of the coefficient values excluding said greatest absolute coefficient value.

10. A method according to claim 1, comprising:

generating a second reference value from the difference or differences between the DC components of the current block and of at least one previously transformed block.

11. A method according to claim 1, wherein said generation of the second reference value comprises:

dividing each block into a certain number of sub-blocks;

calculating the average of the pixel values for the sub-blocks; and generating the second reference value from the difference between the averaged pixel values of the current sub-block and at least another neighbouring sub-block.

12. A method comprising:

transforming information about the spatial frequency distribution of a video data block into pixel values;

generating, prior to said transformation, a first reference value representing the variations in information about spatial frequency distribution within the block;

generating, after said transformation, a second reference value representing the abruptness of variation in certain information between the block and at least one previously transformed video data block from a same frame as the block;

comparing the first reference value to a certain first threshold value and the second reference value to a certain predetermined second threshold value;

detecting an error in the block, as a response to either of the first and second reference values being greater than the first and respectively the second threshold value;

wherein each video data block comprises a number of pixels arranged in rows, and boundary pixels are the pixels closest to the boundary between two blocks, wherein said generation of the second reference value comprises, for a boundary of a block:

calculating a first difference value representing the difference between the pixel value of the boundary pixel and the pixel value of the closest boundary pixel in the same row of the adjacent block;

calculating extrapolated boundary pixel values from the boundary pixels and the closest pixel in the same row of the same block;

calculating a second difference value comprising the difference between the extrapolated boundary pixel values;

comparing the first and second difference values;

adding the smaller of the first and the second values to a sum of differences calculated in the same way for all pixels in the boundary of the block; and generating, for each block boundary, a second reference value from said sum of differences of all pixels in the boundary.

13. A device comprising:

means for transforming information about the spatial frequency distribution of a video data block into pixel values;

means for generating, prior to said transformation, a first reference value representing the variations in information about spatial frequency distribution within the block;

means for generating, after said transformation, a second reference value representing the abruptness of variation in certain information between the block and at least one previously transformed video data block from a same frame as the block;

means for comparing the first reference value to a certain first threshold value and the second reference value to a certain predetermined second threshold value;

means for detecting an error in the block, as a response to either of the first and second reference values being greater than the first and respectively the second threshold value;

means for dividing DCT coefficients of the block into at least two parts, wherein the coefficients of the first part are associated with higher freciuencies than the coefficients of the second part;

means for generating a first reference value from the coefficients of the first part;

means for generating a first threshold value from the coefficients of a set of coefficients not belonging to the first part;

means for forming at least two sets of DCT coefficients from the coefficients not belonging to the first part;

means for generating a first reference value for each formed set of DCT coefficients;

means for generating a corresponding first threshold value for each formed set of DCT coefficients;

means for comparing, for each of the sets, the first reference value of the set with the first threshold value of the set; and means for detecting an error in the block, as a response to any of the first reference values of the set being greater than the corresponding first threshold value of the set.

14. A device according to claim 13 comprising:

means for generating, after decoding a number of blocks forming a macroblock, a third reference value representing the abruptness of variations in certain information within the macroblock;

means for comparing the third reference value to a certain third threshold value; and means for detecting an error in the macroblock, as a response to the third reference value being greater than the third threshold value.

15. A device according to claim 13 comprising means for initiating, as a response to the detected error, an error concealment process.

16. A device according to claim 13 comprising a mobile terminal.

17. An apparatus comprising:

a memory configured to store at least video data blocks; and at least one processor coupled to the memory, the at least one processor configured to transform information about the spatial freciuency distribution of a video data block into pixel values and configured to generate, prior to said transformation, a first reference value representing the variations in information about spatial freciuency distribution within the block, the at least one processor also configured to generate, after said transformation, a second reference value representing the abruptness of variation in certain information between the block and at least one previously transformed video data block from a same frame as the block and to compare the first reference value to a certain first threshold value and the second reference value to a certain predetermined second threshold value, the at least one processor further configured to detect an error in the block, as a response to either of the first and second reference values being greater than the first and respectively the second threshold value, wherein said transformation operation is an inverse DCT transformation of the block, and the at least one processor is further configured to divide DCT coefficients of the block into at least two parts, wherein the coefficients of the first part are associated with higher freciuencies than the coefficients of the second part, and the at least one processor is configured to generate a first reference value from the coefficients of the first part, and to generate a first threshold value from the coefficients of a set of coefficients not belonging to the first part, wherein the at least one processor is further configured to form at least two sets of DCT coefficients from the coefficients not belonging to the first part, to generate a first reference value for each formed set of DCT coefficients, to generate a corresponding first threshold value for each formed set of DCT coefficients and to compare, for each of the sets, the first reference value of the set with the first threshold value of the set, and the at least one processor is further configured to detect an error in the block, as a response to any of the first reference values of the set being greater than the corresponding first threshold value of the set.

18. An apparatus according to claim 17, wherein said first reference values are the greatest absolute coefficient values of a set of DCT coefficients, and the first threshold values comprise a predefined constant value added, as a response to the number of non-zero coefficient values being greater than one, to the absolute sum of the coefficient values excluding said greatest absolute coefficient value.

19. An apparatus comprising:

a memory configured to store at least video data blocks; and at least one processor coupled to the memory, the at least one processor configured to transform information about the spatial frequency distribution of a video data block into pixel values and configured to generate, prior to said transformation, a first reference value representing the variations in information about spatial frequency distribution within the block, the at least one processor also configured to generate, after said transformation, a second reference value representing the abruptness of variation in certain information between the block and at least one previously transformed video data block from a same frame as the block and to compare the first reference value to a certain first threshold value and the second reference value to a certain predetermined second threshold value, the at least one processor further configured to detect an error in the block, as a response to either of the first and second reference values being greater than the first and respectively the second threshold value, wherein each video data block comprises a number of pixels arranged in rows, and boundary pixels are the pixels closest to the boundary between two blocks, wherein said generation of the second reference value comprises, for a boundary of a block, the at least one processor configured to calculate a first difference value representing the difference between the pixel value of the boundary pixel and the pixel value of the closest boundary pixel in the same row of the adjacent block, the at least one processor further configured to calculate extrapolated boundary pixel values from the boundary pixels and the closest pixel in the same row of the same block and to calculate a second difference value comprising the difference between the extrapolated boundary pixel values, the at least one processor additionally configured to compare the first and second difference values, to add the smaller of the first and the second values to a sum of differences calculated in the same way for all pixels in the boundary of the block, and to generate, for each block boundary, a second reference value from said sum of differences of all pixels in the boundary.

20. A computer-readable medium embodied with computer program instructions, execution of the computer program instructions resulting in operations comprising:

transforming information about the spatial frequency distribution of a video data block into pixel values;

generating, prior to said transformation, a first reference value representing the variations in information about spatial freciuency distribution within the block;

generating, after said transformation, a second reference value representing the abruptness of variation in certain information between the block and at least one previously transformed video data block from a same frame as the block;

comparing the first reference value to a certain first threshold value and the second reference value to a certain predetermined second threshold value; and detecting an error in the block, as a response to either of the first and second reference values being greater than the first and respectively the second threshold value, wherein said transformation operation comprises an inverse DCT transformation of the block, and the operations further include:

dividing DCT coefficients of the block into at least two parts, wherein the coefficients of the first part are associated with higher freciuencies than the coefficients of the second part;

generating a first reference value from the coefficients of the first part;

generating a first threshold value from the coefficients of a set of coefficients no belonging to the first part, forming at least two sets of DCT coefficients from the coefficients not belonging to the first part; generating a first reference value for each formed set of DCT coefficients;

generating a corresponding first threshold value for each formed set of DCT coefficients;

comparing, for each of the sets, the first reference value of the set with the first threshold value of the set; and detecting an error in the block, as a response to any of the first reference values of the set being greater than the corresponding first threshold value of the set.

21. A computer-readable medium according to claim 20, wherein said first reference values are the greatest absolute coefficient values of a set of DCT coefficients, and the first threshold values comprise a predefined constant value added, as a response to the number of non-zero coefficient values being greater than one, to the absolute sum of the coefficient values excluding said greatest absolute coefficient value.

22. A computer-readable medium embodied with computer program instructions, execution of the computer program instructions resulting in operations comprising:

transforming information about the spatial freciuency distribution of a video data block into pixel values;

generating, prior to said transformation, a first reference value representing the variations in information about spatial freciuency distribution within the block;

generating, after said transformation, a second reference value representing the abruptness of variation in certain information between the block and at least one previously transformed video data block from a same frame as the block;

comparing the first reference value to a certain first threshold value and the second reference value to a certain predetermined second threshold value; and detecting an error in the block, as a response to either of the first and second reference values being greater than the first and respectively the second threshold value, wherein each video data block comprises a number of pixels arranged in rows, and boundary pixels are the pixels closest to the boundary between two blocks, wherein said generation of the second reference value comprises, for a boundary of a block the operations of:

calculating a first difference value representing the difference between the pixel value of the boundary pixel and the pixel value of the closest boundary pixel in the same row of the adjacent block;

calculating extrapolated boundary pixel values from the boundary pixels and the closest pixel in the same row of the same block;

calculating a second difference value comprising the difference between the extrapolated boundary pixel values;

comparing the first and second difference values;

adding the smaller of the first and the second values to a sum of differences calculated in the same way for all pixels in the boundary of the block; and generating, for each block boundary, a second reference value from said sum of differences of all pixels in the boundary.

* * * * *